United States Patent
Cragun

(10) Patent No.: US 8,249,263 B2
(45) Date of Patent: Aug. 21, 2012

(54) METHOD AND APPARATUS FOR PROVIDING AUDIO MOTION FEEDBACK IN A SIMULATED THREE-DIMENSIONAL ENVIRONMENT

(75) Inventor: Brian John Cragun, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 983 days.

(21) Appl. No.: 12/120,934

(22) Filed: May 15, 2008

(65) Prior Publication Data

US 2009/0285407 A1 Nov. 19, 2009

(51) Int. Cl.
 *H03G 3/00* (2006.01)
(52) U.S. Cl. .............................. 381/61; 345/184; 345/420
(58) Field of Classification Search .................... 381/61; 345/184, 420
 See application file for complete search history.

(56) References Cited

U.S. PATENT DOCUMENTS

| | | | | |
|---|---|---|---|---|
| 5,511,187 A * | 4/1996 | Cragun | ...................... | 704/270.1 |
| 5,533,182 A * | 7/1996 | Bates et al. | ..................... | 715/727 |
| 5,771,044 A * | 6/1998 | Cragun et al. | ................ | 345/420 |
| 5,835,692 A * | 11/1998 | Cragun et al. | ................ | 345/419 |
| 6,359,634 B1 * | 3/2002 | Cragun et al. | ................ | 715/777 |
| 6,686,937 B1 * | 2/2004 | Cragun | ......................... | 715/804 |
| 7,264,554 B2 * | 9/2007 | Bentley | ......................... | 473/222 |
| 7,427,201 B2 * | 9/2008 | Meisner | ......................... | 439/48 |
| 7,433,885 B2 * | 10/2008 | Jones | .................................... | 1/1 |
| 7,620,648 B2 * | 11/2009 | Cragun et al. | ........................ | 1/1 |
| 7,752,542 B2 * | 7/2010 | Cragun et al. | ................ | 715/236 |
| 7,848,543 B2 * | 12/2010 | Raghavan et al. | ............ | 382/113 |
| 7,941,444 B2 * | 5/2011 | Cragun et al. | ................ | 707/784 |
| 2002/0050923 A1 | 5/2002 | Petersen | | |
| 2004/0260702 A1 * | 12/2004 | Cragun et al. | ................ | 707/100 |
| 2004/0260714 A1 * | 12/2004 | Chatterjee et al. | ............ | 707/101 |
| 2004/0267798 A1 * | 12/2004 | Chatterjee et al. | ............ | 707/102 |
| 2005/0131924 A1 * | 6/2005 | Jones | ............................ | 707/100 |
| 2005/0186544 A1 * | 8/2005 | Raghavan et al. | ............ | 434/262 |
| 2005/0193421 A1 * | 9/2005 | Cragun | ........................... | 725/80 |
| 2007/0052674 A1 | 3/2007 | Culver | | |
| 2007/0091063 A1 | 4/2007 | Nakamura et al. | | |
| 2007/0161263 A1 * | 7/2007 | Meisner | ......................... | 439/48 |
| 2007/0270214 A1 * | 11/2007 | Bentley | ........................... | 463/30 |
| 2007/0298877 A1 | 12/2007 | Rosenberg | | |
| 2008/0226134 A1 | 9/2008 | Stetten et al. | | |
| 2009/0036212 A1 | 2/2009 | Provancher | | |
| 2009/0063552 A1 * | 3/2009 | Jones | ............................ | 707/102 |
| 2009/0076476 A1 * | 3/2009 | Barbagli et al. | ............. | 604/500 |
| 2009/0085751 A1 | 4/2009 | Sakama et al. | | |
| 2009/0210797 A1 * | 8/2009 | Cragun et al. | ................ | 715/730 |
| 2009/0210812 A1 * | 8/2009 | Cragun et al. | ................ | 715/771 |
| 2009/0282369 A1 * | 11/2009 | Jones | ............................ | 715/848 |
| 2009/0285407 A1 * | 11/2009 | Cragun | ........................... | 381/61 |
| 2010/0177064 A1 * | 7/2010 | Cragun | ......................... | 345/184 |
| 2010/0177065 A1 * | 7/2010 | Cragun | ......................... | 345/184 |

\* cited by examiner

*Primary Examiner* — Laura Menz
(74) *Attorney, Agent, or Firm* — Patterson & Sheridan, LLP

(57) ABSTRACT

Embodiments of the invention provide method, system, and computer readable storage medium for providing an audio motion feedback to a user of a simulated three-dimensional ("3D") environment, where the user controls an entity within the simulated 3D environment. A plurality of gridlines is projected over the simulated 3D environment to form a virtual 3D grid. A crossing of at least one boundary point by the entity is detected, wherein the boundary point is located on or within a threshold distance from at least one of the plurality of the projected gridlines. At least one boundary point type of the crossed boundary point is determined. At least one audio motion signal associated with the determined boundary point type is generated, thus providing audio motion feedback to the user regarding the entity's movements in the simulated 3D environment.

20 Claims, 4 Drawing Sheets

METHOD AND APPARATUS FOR PROVIDING AUDIO MOTION FEEDBACK IN A SIMULATED THREE-DIMENSIONAL ENVIRONMENT

BACKGROUND OF THE INVENTION

1. Field of the Invention

The field of the invention relates to generating an audio motion feedback, e.g., providing audio motion feedback to a user interacting with a simulated three-dimensional ("3D") environment.

2. Description of the Related Art

Simulated three-dimensional ("3D") environments have become a standard part of modern life and the World Wide Web. One prominent example of a simulated 3D environment is a 3D virtual world. A virtual world is a simulated environment in which users may inhabit and interact with computer generated characters or with one another via avatars. An avatar may provide a graphical representation of an individual within the virtual world. The simulated virtual worlds usually are made to comprise features that are similar to a real world, e.g., having physical features such as trees, streets, buildings, rooms, hallways, and the like.

Another example of a simulated 3D environment is in the field of video games. A player may manipulate the movement of a character within the simulated 3D environment of the video game. However, use of simulated 3D environments is not limited to the web or gaming. For example, in the real estate industry a simulated 3D environment can simulate a walk through of a house, whether the house already exists or has not been built yet.

The simulated 3D environments are largely visual, meaning that objects within the simulated 3D environment are represented primarily through images. Audio often serves only as an afterthought. For example, to determine a location in a simulated virtual world, the user would often use tools, such as maps, compasses, and appearances of a surrounding environment. However, such tools are inherently visual. Even communications between users and/or characters of simulated 3D environments are often performed via online chat and such communications do not involve audio support.

SUMMARY OF THE INVENTION

The present invention generally provides a method, apparatus, and computer readable storage medium for providing an audio motion feedback to a user of a simulated three-dimensional ("3D") environment.

One embodiment of the invention includes a method for providing an audio motion feedback to a user of a simulated 3D environment. The method generally includes detecting a crossing of at least one boundary point by an entity within a simulated 3D environment. A plurality of gridlines forming a virtual 3D grid is projected over the simulated 3D environment, wherein the at least one boundary point is within a threshold distance from at least one of the plurality of the gridlines. The method also includes determining at least one boundary point type of the at least one boundary point. The method further includes providing at least one first audio motion signal associated with the determined at least one boundary point type.

Another embodiment of the invention includes a computer storage medium containing a program which, when executed, performs a method for providing an audio motion feedback to a user of a simulated 3D environment. The method generally includes detecting a crossing of at least one boundary point by an entity within a simulated 3D environment. A plurality of gridlines forming a virtual 3D grid is projected over the simulated 3D environment, wherein the at least one boundary point is within a threshold distance from at least one of the plurality of the gridlines. The method also includes determining at least one boundary point type of the at least one boundary point. The method further includes providing at least one first audio motion signal associated with the determined at least one boundary point type.

Yet another embodiment of the invention includes a system having a processor and a memory containing a program configured to provide an audio motion feedback. When executed on the processor, the program may generally be configured to detect a crossing of at least one boundary point by an entity within a simulated 3D environment. A plurality of gridlines forming a virtual 3D grid is projected over the simulated 3D environment, wherein the at least one boundary point is within a threshold distance from at least one of the plurality of the gridlines. The program may be also configured to determine at least one boundary point type of the at least one boundary point. The program may be further configured to provide at least one first audio motion signal associated with the determined at least one boundary point type.

BRIEF DESCRIPTION OF THE DRAWINGS

So that the manner in which the above recited features, advantages, and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
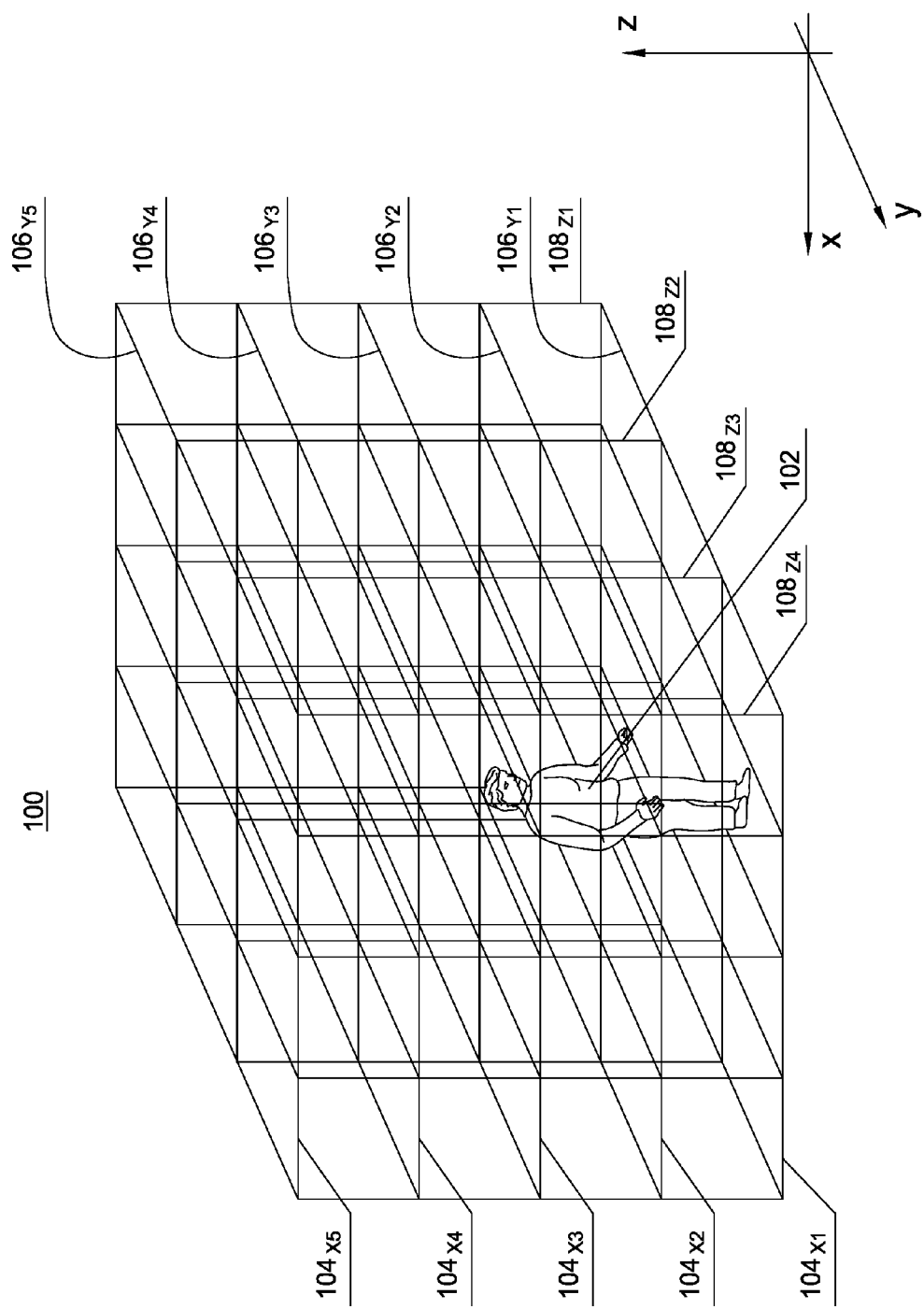
FIG. 1 illustrates an example of a virtual three-dimensional ("3D") grid.

Embodiments of the present invention generally provide methods, apparatus, and computer readable storage mediums for providing an audio motion feedback to a user of a simulated three-dimensional ("3D") environment. As described in greater details below, embodiments of the present invention provide audio motion feedbacks to a user, e.g., a visually impaired user, in his or her interaction with a simulated 3D environment. An audio motion feedback enhances the experience of a user by providing audio feedbacks that represent the user's interaction with a simulated 3D environment, e.g., by providing audio feedbacks representing movements of an entity controlled by the user in the simulated 3D environment. The present invention enhances a user's ability to navigate the simulated 3D environment with an additional feedback, e.g., allowing a visually impaired user to navigate the simulated 3D environment without seeing a visual representation of the environment.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments, and advantages are merely illustrative and are not considered elements or limitations of the appended claims except where explicitly recited in claims. Likewise, reference to "the invention" shall not be construed as a generalization of any inventive subject matter disclosed herein and shall not be considered to be an element or limitation of the appended claims except where explicitly recited in claims.

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are some of the embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 illustrates an example of a virtual 3D grid 100 in accordance to a coordinate system, according to one embodiment of the invention. A virtual 3D grid 100 may be described as a plurality of lines, such as gridlines $104_{x1-x5}$, $106_{y1-y5}$, and $108_{z1-z4}$, that are projected (visibly or invisibly) through the space of a simulated 3D environment in accordance with a Cartesian coordinate system to create a grid in each plane of the Cartesian coordinate system. For example, as shown in FIG. 1, gridlines $106_{y1-y5}$ and gridlines $108_{z1-z4}$ create a grid in the YZ plane of the Cartesian coordinate system. It should be noted that while not expressly identified in FIG. 1 grids in the XY plane and in the XZ plane of the Cartesian coordinate system are formed in a similar manner. The gridlines demark the simulated 3D environment (discussed in greater detail below) such that an entity (e.g., a person, an object, a vehicle, a pointer, and so on), in this embodiment character 102, while moving through the simulated 3D environment and crossing boundary points located on or within a threshold distance of the gridlines will cause audio motion feedbacks representing the entity/character's movement to be generated.

In one embodiment, the gridlines are uniformly spaced within the virtual 3D grid 100. In another embodiment, the gridlines are uniformly spaced only within one of the planes of the virtual 3D grid 100, e.g., XY plane. In yet another embodiment, distances between the gridlines are defined by some characteristics of the simulated 3D environment (e.g., landscape).

In FIG. 1, the virtual 3D grid 100 is illustratively shown having a cubic shape. However, it should be noted, that the virtual 3D grid could be of any shape, e.g., a circular shape, an elliptical shape, and the like. In one embodiment, the shape of the virtual 3D grid is affected by the shape of the simulated 3D environment. For example, the virtual 3D grid projected over an elliptically shaped simulated 3D environment may have curved gridlines instead of straight gridlines and so on.

Further, though FIG. 1 illustrates the virtual 3D grid 100 based on a Cartesian coordinate system, other 3D coordinate systems can be used to create, describe, or access virtual 3D grids, e.g., a toroidal coordinate system, spheroidal coordinate system, elliptic cylindrical coordinate system, ellipsoidal coordinate system, or parabolic cylindrical coordinate system. In one embodiment, the shape of a simulated 3D environment and/or a desired shape of the virtual 3D grid may affect the type of coordinate system to be used to create the virtual 3D grid.

It should be also noted that the virtual 3D grid 100 can be created on any desired scale, e.g., micro, standard, or macro scale. Furthermore, the scale of the virtual 3D grid, the shape of the virtual 3D grid, and/or the coordinate system used could be changed as needed as the user navigates a simulated 3D environment. For example, as the velocity of a character moving through the simulated 3D environment increases, the scale of the virtual 3D grid increases, as the velocity of the character decreases, the scale of the virtual 3D grid decreases as well. Similarly, the shape of the virtual 3D grid can be changed when the shape of the simulated 3D environment has been changed. Further, the user controlling the character may choose what scale of the virtual 3D grid, what shape of the virtual 3D grid, and/or which coordinate system should be used and adjust them as needed.

Figure 2:
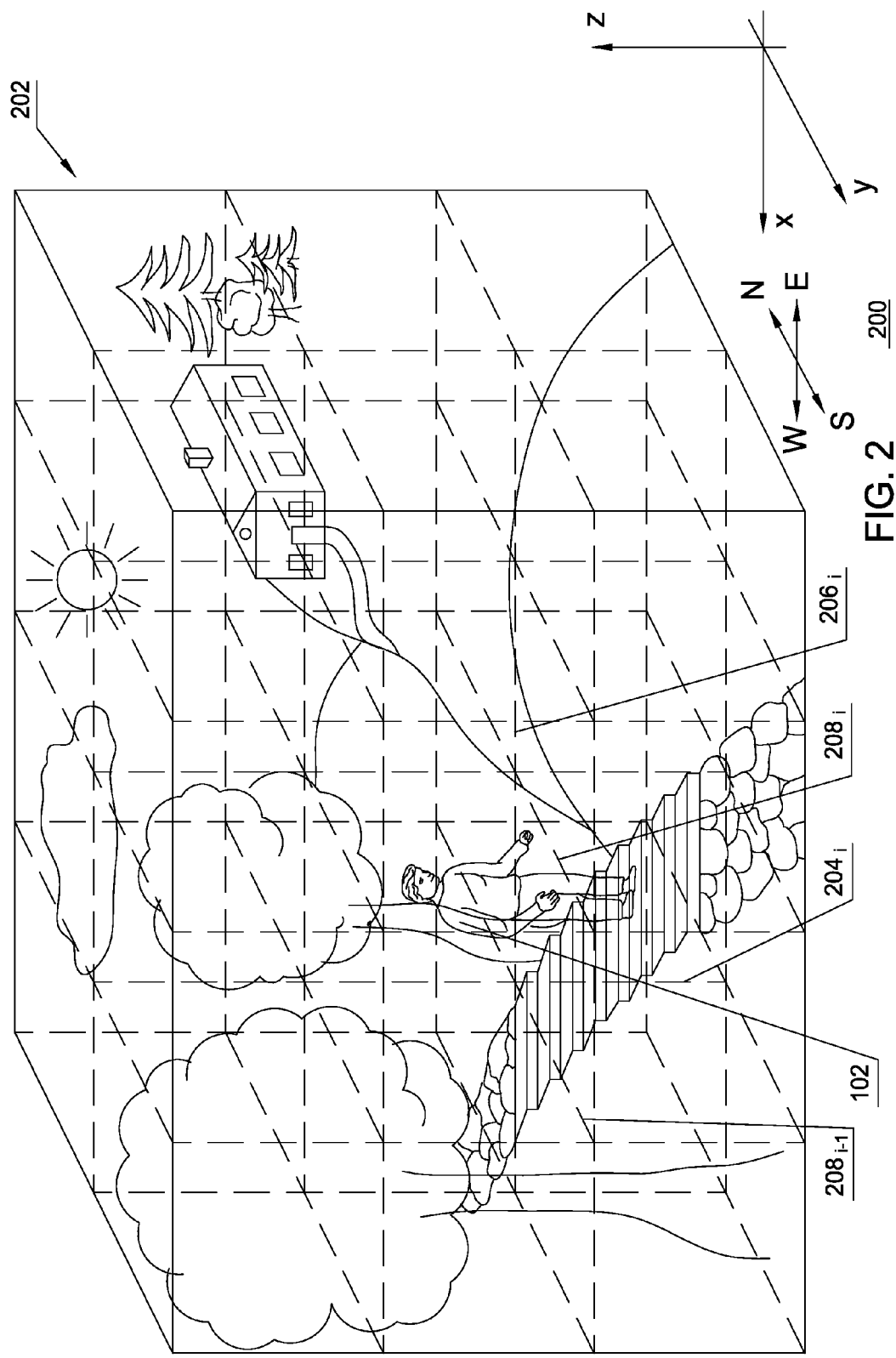
FIG. 2 illustrates an example of a simulated 3D environment.

FIG. 2 illustrates an example of a simulated 3D environment 200. In this particular example, the simulated 3D environment 200 is used in a computer game which takes place in a simulated 3D world having physical features that are similar to the real world. The simulated 3D environment may comprise buildings, trees, roads, hills, and other objects of ordinary life. A virtual 3D grid 202, which in this embodiment has uniformly distributed gridlines, is projected over the space of the simulated 3D environment 200. Controlled by a user, a character 102 may move through the simulated 3D environment 200. As the character 102 moves, he crosses the gridlines of the virtual 3D grid 202, such as $204_i$, $206_i$, and $208_i$.

In one embodiment of the invention, the gridlines of the virtual 3D grid 202 are considered to be boundary points. In another embodiment any point of the simulated 3D environment that is within a certain threshold distance from at least one of the gridlines of the virtual 3D grid 202 is considered to be a boundary point. When the character 102 crosses such a boundary point, relevant audio motion signal(s) corresponding to the type(s) of the boundary point can be generated (boundary point types and generated audio motion signals are discussed in greater detail below). The audio motion signal(s)

indicate to the user various information pertaining to the character 102, e.g., in what direction the character 102 is moving, where he is located, the velocity of his movement, and the like.

For example, in one embodiment, when the character 102 crosses a boundary point, e.g., the gridline $204_i$, $206_i$, or $208_i$, an audio motion signal indicating the boundary point type of the boundary point (in this example, the type of the gridline crossed) is generated, e.g., crossing the gridline $204_i$, $206_i$, or $208_i$, causes an audio motion signal to be generated reflecting that respectively a Z-type, an X-type, or an Y-type gridline is being or was crossed. In another embodiment, crossing the same boundary point, e.g., the gridline $208_i$, causes a different audio motion signal to be generated. For example, the generated audio motion signal may allow the user to determine the direction that the character 102 is moving within the simulated 3D environment, e.g., if the character 102 was moving from the gridline $208_{i-1}$ towards the gridline $208_i$, crossing the gridline $208_i$ would cause generating of an audio motion signal indicating to the user that the character 102 is moving East. In yet another embodiment, the user could hear an audio motion signal indicating a velocity of the character 102. Generated audio motion signals provide an audio motion feedback that gives the user a sense and/or understanding of the location, direction, velocity, and/or the like of how the character 102 is interacting with the simulated 3D environment.

Figure 3:
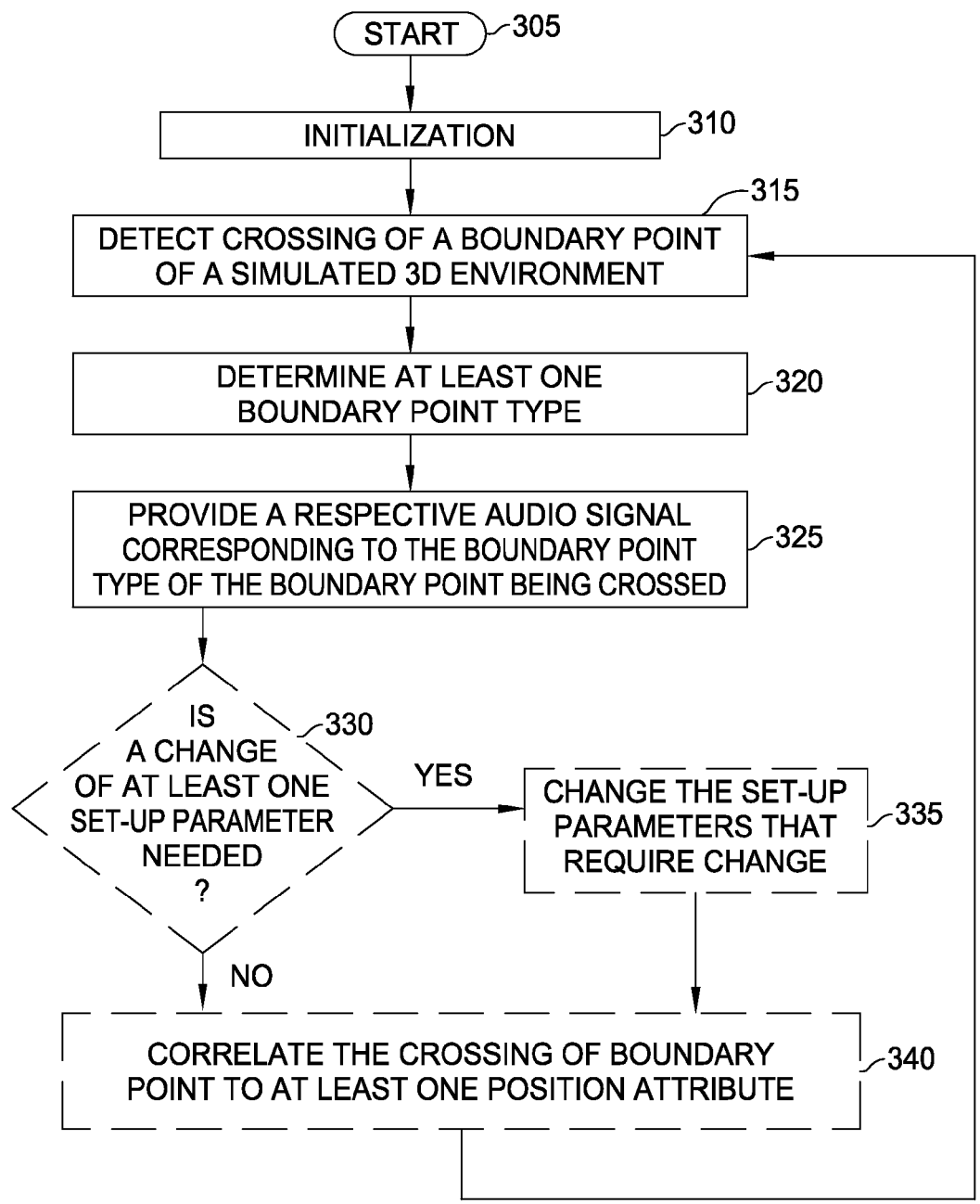
FIG. 3 illustrates a flowchart depicting a process for providing an audio motion feedback, according to one embodiment of the invention.

FIG. 3 illustrates a flowchart depicting a method or process 300 for providing an audio motion feedback according to one embodiment of the present invention. As shown, the method/process 300 starts at step 310 where a system, e.g., a general purpose computer, is initialized. For example, the initialization step may involve setting-up numerous parameters and attributes (described below in greater detail) and/or the user's preferences. The parameters and attributes can be pre-set (e.g., the parameters and attributes can have default settings); set according to the user's preferences (e.g., the users can select all or some of the parameters and attributes); automatically set up by the system (e.g., the system might have different setting for distinct simulated 3D environments, such as using a spheroidal coordinate system as a basis for a virtual 3D grid projected over a spherically-shaped simulated 3D environment, while using a Cartesian coordinate system for a cuboidally-shaped simulated 3D environment), or combination thereof. Further, the parameters and attributes' settings can differ for different users (e.g., each user can have a different profile).

At step 315, the system detects a character 102 crossing one of the boundary points of the simulated 3D environment. According to one embodiment of the present invention, the gridlines of the virtual 3D grid are boundary points of the simulated 3D environment. Alternatively, a boundary point is any point of the simulated 3D environment that is within a threshold (e.g., within a distance of) of the gridline nearest at the time to the character 102. Such a threshold may be set up once or changed as needed. It could be set up/changed by a system or by a user. In other words, the boundary point may represent the gridline itself or a distance within the gridline.

At step 320, the boundary point type of the boundary point being crossed is determined. In one embodiment, the boundary point types are associated with a coordinate system on which the virtual 3D grid is based. For example, each such boundary point type may simply indicate a dimension of the simulated 3D environment according to the coordinate system used (e.g., X-type, Y-type, and Z-type). Accordingly, if an entity crosses a gridline parallel to, for example X-axis of the coordinate system, then an audio motion signal is generated indicating to the user controlling the entity that the entity crossed a gridline of a respective type, in this example, an X-type gridline. In this embodiment, at least some of the boundary points have only one boundary point type associated with them (e.g., the boundary points located on a gridline parallel to the Z-axis of the virtual 3D grid's coordinate system are always of the Z-type).

Alternatively, the same boundary point may have more than one boundary point type associated with that boundary point. In one embodiment while such boundary points have more than one boundary point type associated with them, they can be determined to be of only one boundary point at a time (e.g., boundary point types reflecting directionality of the entity/character's movement, such as East, West, South, North; right, left, straight, backwards; up, down; and the like). Thus, for example, if the character approached a boundary point coming from the North, the boundary point type will be determined as being South. However, if the character approached the same boundary point coming from the South, the boundary point type of this boundary point will be determined as being North. Similarly, the same boundary point can be determined to be of a right, left, straight, or backwards boundary point type depending on the previous movements of the character.

In yet another embodiment, boundary points not only have more than one boundary point type associated with them, but also these boundary points are determined to be of more than one boundary point type when the character crosses them. For example, each boundary point may have a primary boundary point type, for example, to identify which gridline has been crossed (e.g., X-type described above) and secondary boundary point type, for example, to identify more specifically the directionality of the character's movement (e.g., South-type described above). It should be noted that other secondary boundary point types can be used as well, e.g., time, distance from a certain location (e.g., base point) within the simulated 3D environment, distance travelled by the character, physical coordinates, and the like.

The number of boundary point types used can be minimal (e.g., to represent each dimension of the simulated 3D environment) or more boundary point types can be used (e.g., using at least two boundary point types for each dimension, one type corresponding to boundary points having positive coordinates along the dimension' axis, such as X-type positive, Y-type positive, and Z-type positive, and one type corresponding to boundary points having negative coordinates along the axis, such as X-type negative, Y-type negative, and Z-type negative). Furthermore, the boundary point types used may depend on the requirements of a particular implementation. For example, in some applications using boundary point types corresponding to a coordinate system used (e.g., X-type, Y-type, and Z-type) may not suffice. An additional boundary point type might be needed (e.g., time).

It should be noted that a user may cross several boundary points simultaneously. The types of the simultaneously crossed boundary points may be the same (e.g., X-type, where a distance between two adjacent X-type gridlines is smaller than the height of a character crossing them) or different (e.g., intersection of two or more gridlines such as intersection of X-type gridline and Y-type gridline). Optionally, boundary points that represent several boundary point types are assigned a special boundary point type (e.g., XY crossing type, YZ crossing type, XZ crossing type, XYZ crossing type, and the like).

In one embodiment, the boundary point types are predetermined according to a specific implementation. However, in another embodiment, the user is provided with an opportunity to define and/or set the boundary point types. Further, as the user navigates through the simulated 3D environment, the user may be provided with an opportunity to redefine/reset the previously defined boundary point types.

At step 325, the user is provided with a respective audio motion signal corresponding to the type of boundary point being crossed. When the character controlled by the user crosses a boundary point (e.g., a point located on a gridline or within a threshold distance of at least one of the gridlines) an audio motion signal is generated, so that the user could recognize a location (e.g., on an X-type gridline) of the character or/and the direction that the character is moving (e.g., the character is moving South). There are numerous variations of audio motion signal(s) that could be provided to a user (e.g., an audio signal of any tone or frequency). In general, any type or kind of audio signal may be used as long as it provides understandable feedbacks to the user as the character moves in the simulated 3D environment (e.g., a direction that the character moves). The following are merely the examples of the audio motion signals that could be used to provide audio motion feedbacks.

An audio motion signal may comprise a single tick (click, jingle, or the like), a series or pattern of ticks, a musical composition, spoken words (e.g., "left," "right," "up," "down," "south," "north," and so on), or the like. The audio motion signal may be fast or slow (e.g., musical composition having a fast or slow temp), short or long (1/10 of a second vs. 1 second), quiet or loud, high or low, and the like. Any type of instrument may be used to provide the audio motion signals (e.g., piano, trombone, drums, and the like). The audio motion signals may be flat (e.g., the same click repeated) or have emphasis or fluctuations (e.g., whoosh sounds).

As mentioned above, the user can be provided with audio motion signals that are words. In one embodiment, such words are simply used as any other audio motion signal (e.g., providing the audio motion signal "Hooray" when a character crosses a corresponding boundary point). In another embodiment, the words used as audio motion signals are meaningful words (e.g., providing the audio motion signal "North" when the character moves North). A variety of information may be provided to the user regarding the character's movements in the simulated 3D environment via words audio motion signals, such as the boundary point type of the boundary point being crossed, distance to a base point in the simulated 3D environment, time, velocity of the character, and so on.

Furthermore, the audio motion signals may indicate to the user a direction that the character is moving. For example, the audio motion signal(s) may indicate to the user that the character moved right or left, backward or forward comparing to a vector of the character's previous move. Alternatively or additionally, the user may be informed via the audio motion signal(s) whether the character is moving East, West, North, or South within the simulated 3D environment, or be provided with more detailed information (e.g., South-West). Further, the user may be informed about absolute coordinates of the character's current location in the simulated 3D environment.

In one embodiment of the present invention, each boundary point type is associated with a unique audio motion signal, which is generated every time the character crosses the boundary point of such a boundary point type (e.g., every time a character crosses an X-type gridline, the user would hear an "X" sound). In another embodiment, a boundary point type may be associated with a variety of audio signals. Thus, although the character may cross two boundary points of the same boundary point type in a row, the audio motion signals generated in response to such crossings would vary. For example, the generated audio motion signals may be chosen from a variety of audio motion signals associated with that boundary point type (e.g., X-type gridline No. 7, X-type gridline No. 8).

Alternatively, the audio motion signals generated when the character crossed two boundary points of the same boundary point type, while sounding different, may be generated by modifying a single audio motion signal associated with that boundary point type. Modification of the audio motion signal may depend on certain characteristics of the character's movement through the simulated 3D environment, such as character's velocity/speed at the time of crossing a boundary point, characters' elevation in the simulated 3D environment, a distance between the location of the character and the location of a certain place in the simulated 3D environment, and the like. For example, the tone of the generated audio motion signal can be lower as the character's elevation in the simulated 3D environment decreases and higher as the character's elevation increases; the volume of the generated audio motion signal may become louder, as the character approaches a pre-selected location in the simulated 3D environment, and quieter as the character moves farther away.

Further, the generated audio motion signals may vary, for example, by their tone, pitch, timbre, or pattern sound. For example, as the user's Z-coordinate at boundary points being crossed increases, the tone or pitch of the provided audio motion signals becomes higher or longer as compared to the previously provided audio motion signals. As the user's Z-coordinate at boundary points being crossed decreases, the tone or pitch of the provided audio-motion signals becomes lower or shorter as compared to the previously provided audio motion signals. Optionally, a certain position of the character in the simulated 3D environment can be associated with a base tone or pitch so the modifications of the tone or pitch are made as relevant to such position.

As described above, modifications of an audio motion signal's tone, pitch, and the like are used to differentiate audio motion signals corresponding to a single boundary point type. However, it should be noted the described modification can be used to differentiate audio motion signals corresponding to different boundary point types (e.g., all audio motion signal associated with every boundary point type are of the same kind, such as a classical phone ring, however vary in tone or speed depending on the boundary point type). For example, sharp tones may be used to indicate that the character is moving in one direction of the simulated 3D environment (e.g., along X-axis of the virtual 3D grid's coordinate system), soft tones may be used to indicate that the character is moving in another direction of the simulated 3D environment (e.g., along Y-axis of the virtual 3D grid's coordinate system).

Furthermore, in one embodiment, the audio motion signals are provided once, e.g., at the time the boundary point is being crossed. In another embodiment the audio motion signals are provided at least several times. For example, the audio motion signal generated when the character crossed a boundary point may be provided repeatedly until another boundary point is crossed, or a different audio motion signal has been generated.

It should be noted that the described audio motion signals are simply examples of possible audio motion signals. However, the present invention is not limited to the above-described examples. For example, various combinations of the described audio motion signals can be used, the audio motion signals may be mixed and matched and/or may be changed depending on requirements of a particular implementation or according to the user's preferences.

Steps 330 and 335 provide an opportunity to set or change (alter) the set-up parameters (e.g., audio motion signal(s)

associated with a boundary point type, type of a coordinate system associated with the virtual 3D grid, scale of the virtual 3D grid, and so on) of the simulated 3D environment. In one embodiment, such set-up parameters may have been previously set up during the initialization step 310. However, a user may want to alter one or more set-up parameters (e.g., to assign a new audio motion signal to one of the boundary point types) and/or set new set-up parameters (e.g., to create a new boundary point type and assign audio motion signal(s) to that boundary point type). In other words, step 330 allows the user to request such a change/set-up.

It should be noted that values of some of the set-up parameters may continuously stay the same (e.g., a coordinate system of the virtual 3D grid stays the same while the user navigates the simulated 3D environment), while values of other set-up parameters may be changed (e.g., while navigating a character through the simulated 3D environment, a user might decide that he does not like an audio motion signal, "click," generated when the character crosses, for example, an X-type boundary point and requests the audio motion signal associated with the X-type boundary point type to be altered to "jingle"). As mentioned above, such changes may be made upon the user's request(s) (e.g., the system may provide opportunity(ies) to the user to alter at least some of the set-up parameters, namely user-selectable parameters).

Alternatively or additionally, at least some of the set-up parameters may be automatically altered by the system (e.g., if the system detects that the character moves too slowly, the system may decrease the scale of the virtual 3D grid, so the character crosses the next boundary point sooner than with the original scale, thus providing audio motion feedback to the user sooner). In one embodiment, whether a system may automatically change some or all of the set-up parameters depends on the user's preferences (e.g., preferences entered at the initialization step 330). In another embodiment, whether a system may automatically change some or all of the set-up parameters depends on the requirements of a particular implementation.

It should be further noted that some set-up parameters may be changed every time the character crosses a boundary point or other qualifying event takes place (e.g., the character moves with a certain speed, reached a certain point, or the user requested a change and the like), other set-up parameters would be altered only occasionally, or not altered at all (e.g., the user is satisfied with the provided audio motion feedback. In one embodiment, many of the set-up parameters may be changed on the fly. For example, if the user finds that the virtual 3D grid's size and/or scale is inappropriate, then the user may dynamically change the virtual 3D grid's size and/or scale at any point of time of navigating through the simulated 3D environment.

The set-up parameters generally represent different characteristics of the system (e.g., a set-up parameter identifying whether a user may change the set-up parameters while navigating through the simulated 3D environment), and the simulated 3D environment in particular (e.g., shape of the virtual 3D grid). For the purpose of describing the set-up parameters in a coherent way, the set-up parameters have been separated in several groups. However, it should be noted that the set-up parameters described are only examples of the set-up parameters used by the system, and that the present invention is not limited to the provided examples. It should be also noted that some embodiments use fewer set-up parameters as compared to other embodiments.

First, there are set-up parameters related to the virtual 3D grid. This group includes set-up parameters such as the size of the virtual 3D grid or its different parts (e.g., specific dimensions of different parts of the virtual 3D grid, ratios of some parts of the virtual 3D grid to other parts of the virtual 3D grid, number of the gridlines), scale (e.g., macro, mini, normal; a value by which the virtual 3D grid having a size as identified by the set-up parameter "Size" must be expanded), shape (e.g., cubic shape), orientation (e.g., orientation of the X,Y, and Z axis of the virtual 3D grid's coordinate system within the simulated 3D environment), location (e.g., placement of the coordinate system's origin in the simulated 3D environment), type of coordinate system (e.g., Cartesian coordinate system), visual representation of the virtual 3D grid (e.g., whether the gridlines are visible to the user, which gridlines are visible to the user, how they are presented), and the like.

The next group includes the set-up parameters related to the boundary points, such as what a boundary point is (e.g., simply the gridlines of the virtual 3D grid, area surrounding the gridlines within a certain threshold distance, or the like), threshold value (e.g., specific number, ratio of a distance value between two gridlines, and the like), boundary point types (e.g., X, Y, Z type, unique types for crossing of two or more gridlines, and so on), priority (e.g., whether a certain boundary point type has priority over other boundary point types, for example, where the character crosses several boundary points simultaneously; a certain boundary point is associated with at least two boundary types because, for example, the boundary point is within the threshold distance from at least two gridlines; whether the user should be first informed about crossing a boundary point of a certain boundary point type; and so on).

Another group of the set-up parameters generally includes the set-up parameters related to audio motion signals provided to the user, such as the audio motion signals associated with the boundary point types (see the discussion above about audio motion signals). This groups also includes the set-up parameters indicating volume (e.g., how loud the audio motion signals should be); frequency (e.g., how often the audio motion signal should be provided: ones when a boundary point is crossed or, for example, repeated for at least several times, or provided continuously until crossing of another boundary point requires generating a new audio motion signal); modification (e.g., if several boundary points were crossed simultaneously whether the audio motion signals should be modified), and the like.

Other set-up parameters can be used as well. For example, in one embodiment the user has an option of setting up a base set-up parameter, the set-up parameter that indicates certain location(s), base point (s), within the simulated 3D environment (e.g., on the virtual 3D grid). Such set-up parameters can be used, for example, to provide the user with audio motion signal(s) indicating how far the character is from the base point, whether the character is approaching the base point, and the like, where the audio motion signals used for such purposes may be stored as other set-up parameters. It should be noted that, though not described in details, there is also a group of set-up parameters related to the system itself, such as interface set-up parameters.

If it is determined that at least one of the set-up parameters needs to be changed (e.g., the user requests the change or the system automatically determines that the change is needed), such set-up parameters are changed at step 335 (e.g., new values are assigned to the set-up parameters) and the process continues with the step 340. It should be noted that, if desired, changing values of the set-up parameters can be reflected by audio signals. Each set-up parameter may have its own audio signal informing the user about the change and/or new value.

In one embodiment, changing of a set-up parameter may change the audio motion signals associated with some or all boundary point types. For example, changing a set-up parameter indicating the scale of the virtual 3D grid could change the tone of the audio motion signals indicating the boundary points being crossed, making the tone of the audio motion signals higher as the virtual 3D grid' scale decreases and lower as the scale increases.

If none of the parameters needed changing, then the process goes directly to the step 340. At step 340 crossings of the boundary points are correlated to position attributes. Position attributes allow providing the user with additional information regarding the character's movements in the simulated 3D environment, such as the character's speed/velocity, acceleration, whether he goes up or down (incline position attribute), absolute coordinates, time, distance to a base point, and the like. As soon as the character crosses a first boundary point, the system can use such information to calculate values of the position attributes.

If desired, the values of the position attributes can be provided to the user, e.g., via audio motion signals. In one embodiment of the present invention, each position attribute is associated with audio motion signal(s) that inform the user about the value of the position attribute in an understandable manner. In another embodiment, the values of the position attributes are used to modify respective audio motion signals associated with boundary point types of boundary points being crossed. For example, if one of the position attribute indicates that the character moves down or up, the provided audio motion signal can become a whoosh type signal (e.g., an audio signal that has respectively lower or higher tone at the end of the audio motion signal than at the beginning of the audio motion signal.

Further, as discussed above, the audio motion signals may be provided repeatedly. The repeated audio motion signals may be modified based on the values of the position attributes. For example, if after crossing a first boundary point but before crossing a second boundary point, the character moves up/down, the provided audio motion signals may be modified to a whoosh type of signal based on the value of the incline position attribute to inform the user about the character moving up/down. This allows the user to have a better understanding of how the character moves in the simulated 3D environment, particularly if the character moves slowly the virtual 3D grid' scale is large.

Another example of using a position attribute relates to providing a user with the information on how far the character is from a base point. As discussed above, the user or the system can select a certain point of the simulated 3D environment (e.g., a boundary point) as a base point. The user is provided with audio motion signals indicating how far the character is from that base point. The generated audio motion signals depends on a value of a base-point position attribute (e.g., the base-point position attribute may contain a distance between the character and the base point). The user may be provided with a unique audio motion signal(s) indicating the distance (e.g., the distance is voiced to the user) or, alternatively, the value of the base-point position attribute may be used to modify audio motion signals associated with the boundary point types of boundary points being crossed (e.g., making the generated audio motion signals louder as the character approaches the base point). The modification may be done, for example, via changing values of the respective set-up parameters. Alternatively, the modification may be done without changing the values of the set-up parameters, but instead via applying modification algorithms to the values of the set-up parameters.

Acceleration and/or velocity position attributes may also be used to cause changing of set-up parameters' values. For example, if the character increases or decreases his velocity to a certain threshold value, the set-up parameter reflecting the scale of the virtual 3D grid could be increased or decreased respectively. The velocity and or acceleration position attributes may also be used to change audio motion signals associated with the boundary point types. For example, at a certain velocity or acceleration value, new musical patterns may be assigned to the boundary point types, or the tone of the currently associated audio motion signals may be increased or decreased.

After step 340 is completed the process returns back to step 315. Such a cycle continues for as long as the user navigates the simulated 3D environment. However, it should be appreciated that the order of the steps presented in FIG. 3 could be changed, e.g., step 340 may be performed before steps 330 and 335, and so on. Further, while in one embodiment of the present invention all steps are present; in another embodiment only steps 310 through 325 are present. Furthermore, each illustrated step is not necessarily performed at each cycle of the process (e.g., steps 330, 335, or 340 are omitted). For example, if the user does not want to receive additional signal information generated based on the position attributes, the user might have an option of turning step 340 off, or turning it on and off as desired. Or, if the user does not want any set-up parameters to be changed, the user might have an option of turning the step 330 off for the duration of the session, temporarily, or permanently.

It should be noted that although not specifically specified, one or more steps of method 300 may include a storing, displaying and/or outputting step as required for a particular application. In other words, any data, records, fields, and/or intermediate results discussed in the method can be stored, displayed and/or outputted to another device as required for a particular application. Furthermore, steps or blocks in FIG. 3, which recite a determining operation or involve a decision, do not necessarily require that both branches of the determining operation be practiced. In other words, one of the branches of the determining operation can be deemed as an optional step.

Further, many of the above described set-parameters (e.g., boundary point types, audio motion signals) and/or position attributes (e.g., velocity, acceleration, and so on) may be selectively or fully changed by the user during the initialization step or at any point of using the application. Alternatively or additionally, the system may change the set-parameters) and/or position attributes automatically based on particular qualities of the simulated 3D environment, the user's profile, character's movements and so on.

Figure 4:
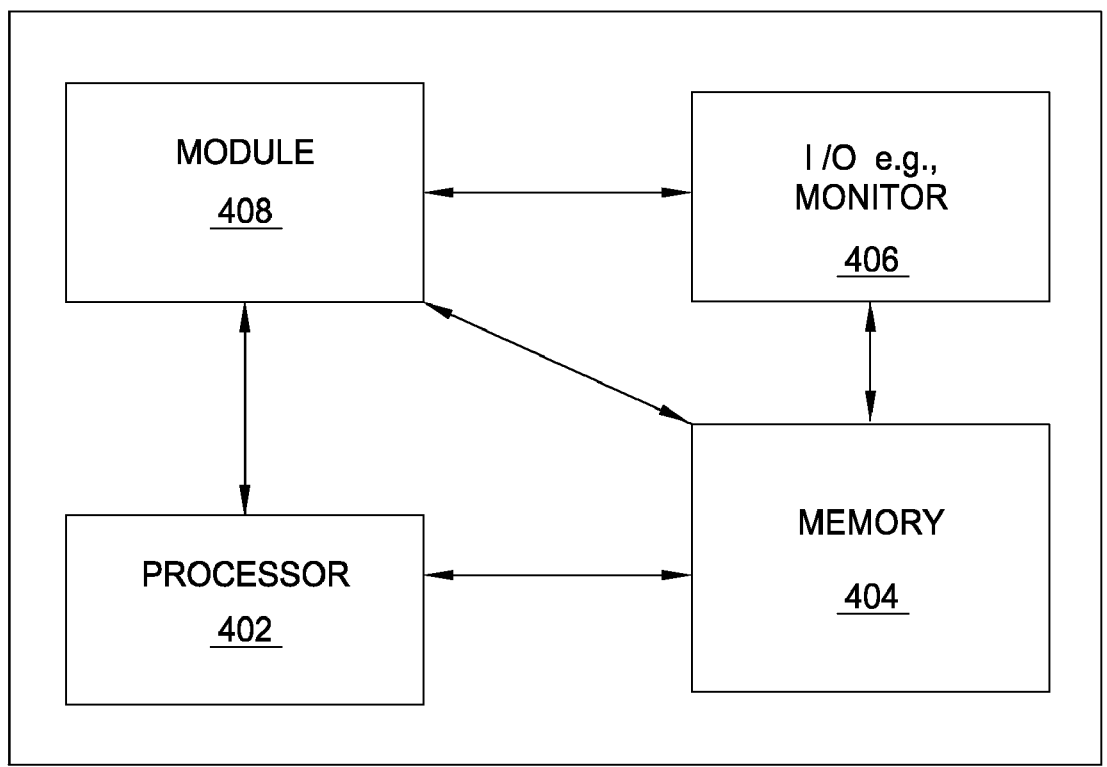
FIG. 4 illustrates a high level block diagram of the method for providing an audio motion feedback that is implemented using a general purpose computing device.

FIG. 4 is a high level block diagram of the method for providing an audio motion feedback that is implemented using a general purpose computing device 400. In one embodiment, a general purpose computing device 400 comprises a processor 402, a memory 404, an audio motion feedback module 408 and various input/output (I/O) devices 406 such as a monitor, a keyboard, a mouse, a modem, a printer, and the like. In one embodiment, at least one I/O device is a storage device (e.g., a disk drive, an optical disk drive, a floppy disk drive). A person skilled in the art understands that the audio motion feedback module 408 can be implemented as a physical device or subsystem that is coupled to a processor through a communication channel.

Alternatively, the audio motion feedback module 408 can be represented by one or more software applications (or even a combination of software and hardware, e.g., using Application Specific Integrated Circuits (ASIC), Field Programmable Gate Arrays (FPGAs) or Digital Signal Processors (DSPs)), where the software is loaded from a storage medium (e.g., I/O devices 406) and operated by the processor 402 in the memory 404 of the general purpose computing device 400. Thus, in one embodiment, the audio motion feedback module 408 described herein with reference to the preceding Figures can be stored on a computer readable medium or carrier (e.g., RAM, magnetic or optical drive or diskette, and the like).

While the foregoing is directed to embodiments of the present invention, other and further embodiments of the invention may be devised without departing from the basic scope thereof, and the scope thereof is determined by the claims that follow.

What is claimed is:

1. A computer-implemented method for providing an audio motion feedback to a user, comprising:
   detecting, by operation of one or more computer processors communicatively coupled to one or more memory devices, a crossing of at least one boundary point by an entity within a simulated three-dimensional (3D) environment having a plurality of gridlines projected over the simulated 3D environment, the plurality of gridlines forming a virtual 3D grid, wherein the at least one boundary point is within a threshold distance from at least one of the plurality of the gridlines;
   determining at least one boundary point type of the at least one boundary point; and
   providing at least one first audio motion signal associated with the determined at least one boundary point type.

2. The method of claim 1, further comprising:
   presenting at least a portion of the virtual 3D grid.

3. The method of claim 1, wherein the plurality of the gridlines is uniformly spaced.

4. The method of claim 1, further comprising:
   altering at least one set-up parameter of the simulated 3D environment.

5. The method of claim 4, wherein the altering is done in accordance with at least one of: a user selection and a system automatic selection.

6. The method of claim 1, further comprising:
   correlating the crossing of the at least one boundary point to at least one position attribute associated with the entity.

7. The method of claim 6, further comprising:
   providing at least one second audio motion signal associated with a value of the at least one position attribute.

8. The method of claim 6, further comprising:
   modifying the at least one first audio motion signal based on a value of the at least one position attribute.

9. The method of claim 6, further comprising:
   altering at least one set-up parameter of the simulated 3D environment in accordance with a value of the at least one position attribute.

10. The method of claim 7, wherein the at least one first audio motion signal and the at least one second audio motion signal are provided in accordance with at least one of: a user selectable set-up parameter and a system selectable set-up parameter.

11. A computer readable storage medium containing a program which, when executed by one or more processors performs an operation for providing an audio feedback to a user of a simulated three-dimensional (3D) environment, the operation comprising:
   detecting a crossing of at least one boundary point by an entity within the simulated 3D environment having a plurality of gridlines projected over the simulated 3D environment, the plurality of gridlines forming a virtual 3D grid, wherein the at least one boundary point is within a threshold distance from at least one of the plurality of the gridlines;
   determining at least one boundary point type of the at least one boundary point; and
   providing at least one first audio motion signal associated with the determined at least one boundary point type.

12. The computer readable storage medium of claim 11, wherein the plurality of the gridlines is uniformly spaced.

13. The computer readable storage medium of claim 12, wherein the method further comprises:
   altering at least one set-up parameter of the simulated 3D environment.

14. The computer readable storage medium of claim 13, wherein the altering is done in accordance with at least one of: a user selection and a system automatic selection.

15. The computer readable storage medium of claim 11, wherein the method further comprises:
   correlating the crossing of the at least one boundary point to at least one position attribute associated with the entity.

16. The computer readable storage medium of claim 15, wherein the method further comprises:
   providing at least one second audio motion signal associated with a value of the at least one position attribute.

17. The computer readable storage medium of claim 15, wherein the method further comprises:
   modifying the at least one first audio motion signal based on a value of the at least one position attribute.

18. The computer readable storage medium of claim 15, wherein the method further comprises:
   altering at least one set-up parameter of the simulated 3D environment in accordance with a value of the at least one position attribute.

19. The computer readable storage medium of claim 16, wherein the at least one first audio motion signal and the at least one second audio motion signal are provided in accordance with at least one of: a user selectable set-up parameter and a system selectable set-up parameter.

20. A system comprising:
   a processor; and
   a memory containing an application for providing audio motion feedback, wherein the application, when executed by the processor, is configured to:
   detect a crossing of at least one boundary point by an entity within a simulated three-dimensional (3D) environment having a plurality of gridlines projected over the simulated 3D environment, the plurality of gridlines forming a virtual 3D grid, wherein the at least one boundary point is within a threshold distance from at least one of the plurality of the gridlines;
   determine at least one boundary point type of the at least one boundary point; and
   provide at least one first audio motion signal associated with the determined at least one boundary point type.

* * * * *